United States Patent
Martynova et al.

(10) Patent No.: US 10,961,399 B2
(45) Date of Patent: Mar. 30, 2021

(54) METHOD OF MANUFACTURING OF INSULATED FLAT LONG-LENGTH SECOND GENERATION HIGH-TEMPERATURE SUPERCONDUCTING WIRES AND WIRE

(71) Applicant: S-Innovations LLC, Moscow (RU)

(72) Inventors: Irina A. Martynova, Moskovskiy Gor. Moscow (RU); Artem M. Makarevich, Moskovskiy Gor. Moscow (RU)

(73) Assignee: S-Innovations LLC, Moscow (RU)

( * ) Notice: Subject to any disclaimer, the term of this patent is extended or adjusted under 35 U.S.C. 154(b) by 0 days.

(21) Appl. No.: 16/992,909

(22) Filed: Aug. 13, 2020

(65) Prior Publication Data
US 2021/0047521 A1    Feb. 18, 2021

(30) Foreign Application Priority Data

Aug. 15, 2019 (RU) .............................. RU2019125791

(51) Int. Cl.
| | | |
|---|---|---|
| C09D 5/02 | (2006.01) | |
| C09D 7/20 | (2018.01) | |
| C09D 179/08 | (2006.01) | |
| C09D 7/63 | (2018.01) | |
| C08K 5/17 | (2006.01) | |

(52) U.S. Cl.
CPC ............... C09D 5/022 (2013.01); C09D 7/20 (2018.01); C09D 7/63 (2018.01); C09D 179/08 (2013.01); C08K 5/17 (2013.01); C08K 5/175 (2013.01)

(58) Field of Classification Search
CPC .......... C09D 7/20; C09D 179/08; C09D 7/63; C09D 5/022
See application file for complete search history.

(56) References Cited

U.S. PATENT DOCUMENTS

| | | | |
|---|---|---|---|
| 2017/0243681 A1* | 8/2017 | Somerkoski | .............. H01F 6/02 |
| 2019/0066883 A1 | 2/2019 | Sakurai et al. | |

FOREIGN PATENT DOCUMENTS

| | | |
|---|---|---|
| CN | 102262934 A | 11/2011 |
| EA | 031113 B1 | 11/2018 |
| JP | 2012064495 A | 3/2012 |
| RU | 2662801 C1 | 7/2018 |

OTHER PUBLICATIONS

Emulsion, Article, last edited on Feb. 24, 2020, https://ru.wikipedia.org/wiki/%D0%AD%D0%BC%D1%83%D0%BB%D1%8C%D1%81%D0%B8%D1%8F.

* cited by examiner

*Primary Examiner* — Paul A Wartalowicz
(74) *Attorney, Agent, or Firm* — Patentbar International, P.C.

(57) ABSTRACT

A method of manufacturing an insulated flat long-length second-generation HTS wire by preparation of an electrodeposition emulsion, stirring the mixture for a time necessary for the neutralization reaction between the polyimide and the stabilizer to occur to form an intermediate solution, adding a precipitating agent to the intermediate solution while stirring; electrodeposition of the emulsion onto a HTS wire in a cathode cell while the HTS wire is moved through the cell containing the emulsion where the cathode is at a negative potential and the wire is at a positive potential; thermal treatment to form an insulating film on the wire surface by heating at a temperature not exceeding 200° C. A long-length HTS wire with a high-quality thin polyimide insulation coating of a high dielectric strength can be obtained, as well as an insulated HTS strand of a complex shape, e.g., of a Roebel type.

9 Claims, No Drawings

METHOD OF MANUFACTURING OF INSULATED FLAT LONG-LENGTH SECOND GENERATION HIGH-TEMPERATURE SUPERCONDUCTING WIRES AND WIRE

RELATED APPLICATIONS

This application claims priority to Russian Patent Application RU 2019125791, filed Aug. 15, 2019, which is incorporated herein by reference in its entirety.

FIELD OF THE INVENTION

The invention relates to manufacturing of insulated flat long-length high-temperature superconducting (hereinafter HTS) wires, as well as insulated HTS wires obtained by this technology.

BACKGROUND OF THE INVENTION

Insulation coatings on second generation HTS wires are made of polyimide that can withstand mechanical impacts at cryogenic temperatures (77 K).

Polyimides are thermally resistant polymers, and they do not feature plasticity below their decomposition temperature; therefore, extrusion method cannot be used for applying insulation on long-length HTS wires. Conventional approach to insulating a HTS wire is to wrap it in a 25-50 micron-thick polyimide tape.

However, an insulation layer made this way lacks uniformity along the wire length due to the overlapping of adjacent turns that significantly increases the resulting HTS wire thickness, and reduces its engineering current density by more than 2 times.

Alternative methods used so far to coat HTS wires with polyimide are based on applying polyimide particles from a solution followed by drying, to remove solvent molecules.

For example, from patent RU 2662801 a method is known that suggests manufacturing electrical insulation of a second-generation HTS wire by way of moving a second-generation HTS wire tape through a deposition cell containing a coating solution with viscosity varying from 10 to 40 Pa-s at ambient temperature, the characteristic constituent of the solution is a polyimide resin precursor or a polyimide resin itself; the solution is uniformly distributed along both sides of the superconducting tape by way of interaction between the applied solution and two cylindrical bodies whose surface features spirally arranged alternating ledges and depressions; thus, an insulating film of a preset thickness is obtained from the applied solution, and is followed by thermal treatment of the superconducting wire with the solution film.

Pursuant to the patent claims, the invention allows obtaining a uniform coating without unevenness and undulation, as well as adjusting and controlling the electrical insulation layer thickness.

However, this method of drawing through a concentrated polyimide solution is not effective due to the poor wettability of the wire edges, and consequently poor quality of the resulting insulation layer at the edges.

The most promising method of applying polyimide insulation is electrophoretic deposition, since it intrinsically yields a sufficiently dense coverage of the wire edges. It also allows applying insulation on strands of a complex shape, e.g., on a HTS cable of Roebel type.

For example, patent application JP 2012064495 describes a method of manufacturing a superconducting wire with a coating that includes the formation of a HTS wire by creating a superconducting layer on a substrate, and supplying electric power to the superconducting wire immersed into a solution for electrodeposition of polyimide, to form a polyimide layer around the superconducting wire. The deposition takes place in an aqueous solution of an anionic polyimide and an organic solvent.

The application also describes a second generation HTS wire obtained by this method. The wire includes buffer layers applied on a substrate, a superconducting layer, and stabilizing layers (optional) which are coated with a polyimide layer.

According to that document, the authors believe that such an electrically deposited coating prevents the delamination of layers applied on the HTS wire substrate.

Unfortunately, the patent provides insufficient information on the procedure of electrodeposition from the solution; however, this patent confirms the possibility of making polyimide layers on second generation HTS wires. One can only guess whether the electrodeposition occurs from a polyimide resin emulsion, or with the use of a precursor in the form of a polyamine acid salt (the latter assumes subsequent high-temperature imidization).

The most similar method of manufacturing of insulated flat conducting wires with an aspect ratio a/b of 12 or greater (a is the wire width; b is the wire height) is described in patent application US 2019066883. This method provides for the preparation of an electrodeposition solution (we use the following composition: 56.5% of polar solvent, 2% of polyimide, 1.5% of triethanolamine, and 40% of acetone) by way of mixing a polyimide resin, with an average molecule weight $M_n$ of $2.0 \times 10^4$ to $4.0 \times 10^4$, with a polar organic solvent and a stabilizer (tripropylamine); the mixture is stirred at a temperature of 20 to 25° C. for a time necessary for the neutralization reaction between the polyimide and the stabilizer to occur (3 hours or greater) to form a well-mixed solution, followed by the addition of a precipitating agent (water) to the mixture to form an emulsion for electrodeposition. Then, the precipitating agent (water) is added dropwise while stirring at a rate of 8000 to 12,000 rpm, to form the emulsion. Then follows the electrodeposition stage consisting in immersing a flat conducting wire with the above mentioned aspect ratio of at least 12 (in our case the ratio was 80-100) into the deposition solution with concurrent passing of direct current at 150 V through the wire, to enable electrodeposition of the polyimide resin particles onto the flat conducting wire surface; then follows the thermal treatment stage where the flat conducting wire is heated, to form an insulating film on its surface. The thermal treatment is comprised of two sub-stages including heating at low temperatures of 150 to 220° C., and heating at high temperatures which are at least 30° C. greater than those of the low-temperature sub-stage.

A flat wire manufactured according to this method is also described.

Authors of that patent application point the advantages of the known method consisting in that an insulated flat conducting wire with a high aspect ratio a/b (12 and greater) features a uniform insulating film formed on the periphery (surface) of the conducting wire.

There are several features that make the known method unsuitable for a fast deposition of thin polyimide insulation layers on long-length second generation HTS wires:

1. The known method has only been tested on specimens of up to 20 mm in length; there is no evidence yet that the method can be used for the insulation of long-length wires.

2. The very high drying temperature of up to 300° C. can result in damage to the HTS wire during thermal treatment.

3. The insulating film is very thick, thicker than 40 microns (it is unknown if the thickness may be controlled).

4. The known method is only suitable for copper alloy wires.

5. The stirring rate of 8,000 to 12,000 rpm during the addition of the precipitating agent is too high.

6. The voltage of 150 V during electrodeposition using the known method is too high, and can lead to the wire damage. We propose to use 10-50 V voltage.

Summarizing the deficiencies of the known method, it can be concluded that this method does not allow to get an insulated long-length HTS wire coated with a high quality uniform thin insulating polyimide layer with a high breakdown voltage, and does not allow applying insulation on a HTS wire (strand) of a complex shape, e.g., of Roebel type. This can be explained by that the resulting emulsion lacks uniformity and long-term stability for electrodeposition of a polyimide film over the whole length of a HTS wire; moreover, the conditions of electrodeposition of a coating onto a long-length HTS wire and conditions of its subsequent thermal treatment, can damage the HTS wire.

These deficiencies of the known method represent a certain technical problem for manufacturing of second generation HTS wires.

SUMMARY OF THE INVENTION

Objective of the invention is to eliminate the above deficiencies. The objective is achieved by manufacturing an insulated flat long-length second-generation HTS wire in line with a method comprising the following stages:

(A) preparation of electrodeposition emulsion as follows: mixing the particles of P84 polyimide resin, a stabilizer chosen from the group comprising tertiary amines whose boiling point does not exceed 200° C., and an organic solvent chosen from the group comprising N-methylpyrrolidone or N,N-dimethylphormamide, then stirring the mixture for a time necessary for the neutralization reaction between the polyimide and the stabilizer to occur, to form an intermediate solution, followed by the addition of a precipitating agent to the intermediate solution while stirring, to form the electrodeposition emulsion; the precipitating agent is added as follows: first, 50-60% of the total amount of the precipitating agent is added while stirring at a rate of 1000-3000 rpm, then, the rest of precipitating agent is added while stirring at a rate not exceeding 100 rpm;

(B) electrodeposition of the emulsion prepared at stage (A) onto a HTS wire in a deposition cathode cell as follows: HTS wire is moved through the—cell containing the emulsion where the cathode is at a negative potential and the HTS wire is at a positive potential, so that the voltage between the cathode and the HTS wire enables the deposition of polyimide particles onto the HTS wire; while the HTS wire is in motion, the emulsion is being constantly stirred by an inert gas flow;

(C) thermal treatment to form an insulating film on the HTS wire surface at a temperature not exceeding 200° C.

In some embodiments of this invention, the objective is achieved by the method wherein the stabilizer used at stage (A) is represented by a tertiary amine chosen from the group comprising triethylamine, tripropylamine, triethanolamine, and tetramethyldiamine.

In some embodiments of this invention, the precipitating agent used at stage (A) is chosen from the group comprising water, ethyl alcohol, isopropyl alcohol, and acetone.

Under the method, at stage (A) the mixture is stirred for 12-60 hours, to perform the neutralization reaction.

Under the method, at stage (A) the precipitating agent is added into the intermediate solution at a rate of 50-500 mL/min Under the method, at stage (B) the wire motion through the emulsion takes place at a voltage of 10-50V.

Under the method, at stage (B) the wire motion through the emulsion takes place at a rate of 10-30 m/hour.

Under the method, at stage (C) the thermal treatment takes place in a through-type furnace with a temperature profile that gradually increases from 100° C. to the thermal treatment temperature.

Under the method, the deposition at stage (B), and the thermal treatment at stage (C) take place onto/with respect to a HTS wire with a copper and/or silver external coating.

The objective can also be achieved by using an insulated flat long-length second-generation HTS wire manufactured in accordance with the previously described claimed method, and coated with polyimide insulation with a thickness of 10-60 μm, and a dielectric strength of at least 100 V/μm.

DETAILED DESCRIPTION OF THE PREFERRED EMBODIMENTS

Second generation HTS wires are multi-layer thin-film structures on flexible metal substrate tapes made of alloys based on nickel or iron.

The superconducting layer of HTS wires is represented by $REBa_2Cu_3O_7$ (REBCO) chemical compound, where RE is a rare-earth element.

Substrate tapes can either feature biaxial texture or not. In the latter case, the texture is created within extra layers between the substrate and the HTS layer. Such extra layers are called buffer layers.

Besides buffer layers, second generation HTS wires can optionally contain protective and/or stabilizing silver and/or copper layers, as well as insulating layers.

The need to apply insulating coatings comes from application requirements to HTS wires, for example, for making HTS magnet coils wherein during insulation failure at a high voltage an electric fault may occur between HTS wire turns.

Insulating layers, for example, of polyimide, can be applied by electrodeposition, as was shown above.

The electrode position method is based on the motion of charged polymer particles in a solution induced by an electric field, with their subsequent deposition onto an electrode surface. The main difficulty in using the electrophoretic deposition method is related to using emulsions lacking stability due to the aggregation of particles followed by their precipitation leading to changes in processing parameters in the course of the deposition and to precipitation of the polymer aggregates onto the wire surface that makes impossible coating of long-length wires (>100 m) with high quality insulation layers.

Basically, an emulsion is a disperse system consisting of microscopic droplets of a liquid (dispersion phase) distributed in another liquid (dispersion media).

As it is knowing from the prior art, the composition of an emulsion for electrodeposition of polyimide insulation contains the following main components: a polymer, a solvent, a precipitating agent, and a stabilizer.

In our invention, the polymer is represented by P84 polyimide resin with the following general formula:

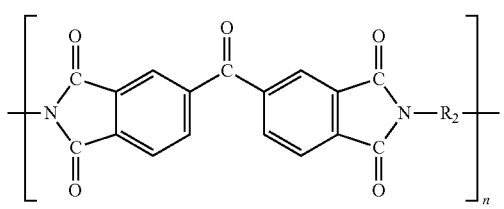

This polymer molecule comprises multiple (n) monomer units, up to 100,000.

P84 polyimide is well soluble in high-donor-number solvents, e.g., in N-methylpyrrolidone or NN-dimethylphormamide (up to 30%).

The precipitating agent can be represented by a low-donor-number solvent (water, simple alcohols, etc.) that forms a single-phase solution with the solvent, but when a critical concentration of the solution is reached, the precipitating agent causes precipitation of the polyimide.

We have tested as precipitating agents the following solvents: water, ethyl alcohol, isopropyl alcohol, and acetone, although, as the claim states, the invention is not limited to only these precipitating agents.

These precipitating agents differ in boiling points. Therefore, if, for example, water is used as a precipitating agent, it requires a longer drying time, or a higher thermal treatment temperature (within the claimed thermal treatment temperature range).

To stabilize the small particles of precipitated polymer, tertiary amines of general formula NR3 can be used, which are soluble in organic solvents, and whose boiling point does not exceed 200° C. that ensures the elimination of these amines during the thermal treatment of the electrodeposited film. The following amines can be used as stabilizers: triethylamine, tripropylamine, triethanolamine, and tetramethyldiamine However, our invention is not limited to only these amines; they may be substituted by any other tertiary amines with a boiling point not exceeding 200° C.

The supposed mechanism of emulsion formation from a polyimide-amine mixture involves the formation of polyamide acid anions in an alkali medium in the presence of water:

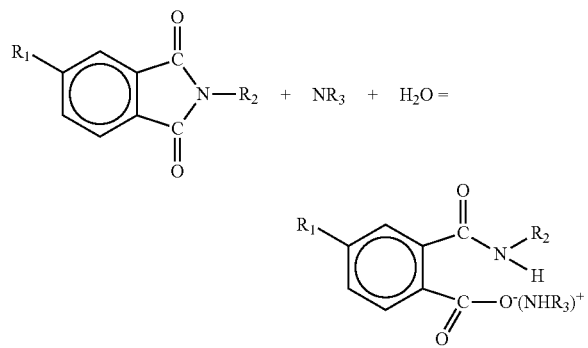

The larger the particles in the emulsion, the higher the electrodeposition rate; however too large particles impair the emulsion stability that is critical for the long-term use of the emulsion when applying insulation on long-length HTS wires.

It is the claimed components of the emulsion and its preparation conditions that allows obtaining a stable emulsion.

The selection of the solvent and precipitating agent is determined by the requirement to obtain dense polymer films.

P84 polyimide has no melting point; therefore, to densify coatings made with P84, it is necessary to partly dissolve the particles deposited onto the wire in the residual solvent; this facilitates the coalescence of P84 particles at high temperatures (150-250° C.).

Hence, the solvent shall have a high boiling point.

On the contrary, the precipitating agent shall have a low boiling point, to quickly evaporate from the precursor film as the tape is exiting the electrodeposition solution.

The combination of all claimed components enables electrodeposition of polyimide coatings on second-generation HTS wires, including those with stabilizing and/or protective silver and/or copper coatings.

Combinations of some components proved to be more efficient for electrodeposition, e.g., combination of N-methylpyrrolidone ($T_{boil}$=202° C.) as solvent and acetone ($T_{boil}$=56° C.) as precipitating agent.

To attain the stated technical result, it is also crucial to choose appropriate conditions for the emulsion formation and electrodeposition of the polyimide layer.

The emulsion is prepared according to the following. First, P84 polyimide particles get mixed with a stabilizer chosen from the group comprising tertiary amines with a boiling point not exceeding 200° C., and an organic solvent (N-methylpyrrolidone or N,N-dimethylphormamide). Such tertiary amines, for example, include triethylamine, tripropylamine, triethanolamine, and tetramethyldiamine, although, the selection of amines is, of course, not limited to the listed ones.

The resulting mixture is then stirred for a time necessary for the neutralization reaction between the polyimide and the stabilizer to occur, to form an intermediate solution.

The quantitative ratio of the reagents (polyimide to tertiary amine) for this reaction can be calculated from the ratio of carbonyl groups of the polyimide to $NH_3$ groups of the tertiary amine as 1:(0.9-1.0).

The time of the neutralization reaction yielding the intermediate solution depends on the volume of the resulting emulsion, the equipment used, and other factors; in our practice, it takes from 12 to 60 hours. Other reaction times are also possible, for instance, under the known method, the minimum time for the neutralization reaction was 3 hours. In our case, dissolution of the polyimide takes place simultaneously with the neutralization reaction, hence, the lower limit of the reaction time is the time required for complete dissolution of the polyimide.

Under the conditions stated, the reaction time of over 12 hours results in an emulsion with the desirable stability and sufficient electrodeposition yield.

The next stage of the proposed method is to add the precipitating agent to the intermediate solution, to form an emulsion for electrodeposition.

Under the claimed method, the precipitating agent is added by two stages as follows: at the first stage 50-60% of the total amount of the precipitating agent is added. To attain the stated technical result, it is vital to control the stirring rate at both stages; at the first stage, the stirring rate is rather high and is in the 1000-3000 rpm range. If the stirring rate falls outside that range, the emulsion becomes unstable and less adhesive to the HTS wire surface that ultimately leads to poor insulation quality of the HTS wire.

In the known method, the stirring rate when the precipitating agent is added is much higher than in our case. It may be related to the fact that in the known method polyimide of a certain molecular weight is selected, or to the properties of the wire being coated, which is made of copper.

At the second stage, the rest of the precipitating agent is added while stirring the mixture at a rate not exceeding 100 rpm. The low stirring rate allows uniform distribution of the precipitating agent without impairing the emulsion stability. There is no certain minimum rate, whereas overrunning the upper limit may result in an unstable emulsion.

It is worth noting that in related art, it is recommended to prepare emulsions ". . . by slow addition of dispersible substance into the disperse system"(https://ru.wikipedia.org/wiki/). Usually, the quantitative meaning of the term "slow addition" is not discussed, since specialists competent in this field are believed to understand the sense of this term. E.g., US 2019066883 contains this terms where it is clarified as: "dropwise addition (of the precipitating agent)".

In our case, the precipitating agent addition rate was different for different volumes of emulsion, and ranged from 50 to 500 mL/min, although, it is obvious that the precipitating agent may be added much slower, i.e., dropwise.

The next stage includes electrodeposition.

To implement this stage, the emulsion is placed in a deposition cathode cell. A HTS wire is moved through this cell whereas the cathode is at a negative potential and the HTS wire is at a positive potential. The voltage between the cathode and the HTS wire and the optimal wire motion speed shall enable the deposition of polyimide particles onto the wire in the form of a dense but thin coating.

The voltage and wire motion speed are selected individually for each wire. For a 4 to 12 mm wide wire, and a 10-20 μm-thick coating, the voltage can be in the 10-50 V range that is much lower than in the known method, and the wire motion speed is 10-30 m/hour.

A critical factor for obtaining thin and uniform coatings is to stir the emulsion by an inert gas flow during electrodeposition, to maintain the emulsion stability.

The next stage of the claimed method includes thermal treatment, to form an insulating film on the HTS wire surface; this includes heating to a temperature not exceeding 200° C. At that temperature, the solvent gets evaporated from the polyimide layer, and the final insulating polyimide coating forms. The temperature limit of 200° C. is because at higher temperatures the HTS wire can be damaged due to mechanical delamination or chemical interaction between the layers that would lead to a drastic degradation of the wire critical current.

Certain advantages can be realized if the thermal treatment takes place in a through-type furnace with a gradual (gradient) increase of temperature that ensures a more uniform heating, so that in addition to the solvent evaporation, the relaxation of thermal stresses within the wire occurs.

Example of the invention embodiment.

Below follows the method of preparing an emulsion that is stable for 48 hours and allows making high-quality insulating coatings on 50-200 μm-thick HTS wires.

Emulsion (per 10 kg of solution) was prepared as follows: 190 g of P84 polyimide resin and 160 g of triethanolamine (pur.) were dissolved in 4020 g of N-methylpyrrolidone (pur.) at a room temperature. Neutralization reaction lasted for 15 hours.

3000 g of acetone (54%) was added to the resulting solution at a rate of 500 mL/min while stirring at a rate of 2000 rpm until a homogeneous solution was formed (for about 5 minutes).

Then, 2680 g of acetone (46%) was added to the resulting solution while stirring at a rate of 100 rpm for 3 s.

Then, electrodeposition from the emulsion onto a moving HTS wire was carried out followed by thermal treatment of the wire.

For this procedure, pieces of a transport tape (5 m long) made of stainless steel, Hastelloy®, or other alloys chemically inert to the emulsion solution were connected to both ends of the HTS wire sample in a copper or silver external coating. The transport tape was spot-welded directly to the metal substrate of the HTS wire, to ensure a reliable electric contact. The entire wire sample together with the transport tape pieces was wound onto a reel; the sample was fed from that reel and drawn using guide rollers through the deposition cell containing the emulsion, and then through a through-type furnace, under conditions specified in Tables 1 and 2.

Table 1 lists the parameters for preparing HTS wires as per Example 1, and per other Examples. (see Examples 2-4).

Table 2 lists the data for a HTS wire as per Example 1, including insulation thickness per wire side, depending on the HTS wire motion speed and on the thermal treatment conditions.

TABLE 1

| Emulsion ingredients | Composition 1, wt. fraction | Composition 2 wt. fraction | Composition 3 wt. fraction | Composition 4[1] wt. fraction |
|---|---|---|---|---|
| P84 | 190 | 290 | 340 | 190 |
| N-methylpyrrolidone | 4020 | — | 7080 | 3990 |
| N,N-dimethylphormamide | — | 6130 | — | — |
| Triethylamine | 160 | — | — | — |
| Tripropylamine | — | — | 270 | — |
| Triethanolamine | — | 250 | — | — |
| Tetramethyldiamine | — | — | — | 180 |
| Hexanol | — | 3330 | — | — |
| Isopropyl alcohol | — | — | 2310 | — |
| Acetone | 5680 | — | — | 5640 |

| | Composition 1 | Composition 2 | Composition 3 | Composition 4 |
|---|---|---|---|---|
| Emulsion preparation conditions | | | | |
| Neutralization reaction time, hours | 15 | 12 | 60 | 45 |
| Precipitating agent feed rate, mL/min | 500 | 50 | 200 | 500 |
| Precipitating agent amount at stage 1, % | 54 | 50 | 58 | 60 |
| Precipitating agent amount at stage 2, % | 46 | 50 | 42 | 40 |
| Stirring rate at stage 1, rpm | 2000 | 3000 | 1000 | 2000 |
| Stirring rate at stage 2, rpm | 100 | 50 | 50 | 10 |
| Electrodeposition conditions | | | | |
| Voltage, V | 30 | 30 | 30 | 30 |
| HTS wire motion speed, m/min | 20 | 20 | 20 | 20 |
| Thermal treatment conditions | Through-type furnace; temperature gradient from 100 to 200° C. | | | |
| HTS wire properties | | | | |
| Insulating coating thickness, μm | 15 | 20 | 25 | 15 |
| Dielectric strength, V/μm | 150 | 120 | 100 | 150 |

[1]Deposition of an electrical insulating coating on a Roebel type strand.

TABLE 2

| HTS wire width, mm | | 4 | | 6 | 12 |
|---|---|---|---|---|---|
| HTS motion speed, m/h | 15 | 15 | 20 | 15 | 10 |
| Current, mA | 20 | 30 | 20 | 35 | 40 |
| Voltage, V | 15 | 23 | 18 | 30 | 30 |
| Initial temperature of thermal treatment, ° C. | 100 | 100 | 100 | 100 | 100 |
| Final temperature of thermal treatment, ° C. | 180 | 180 | 200 | 200 | 200 |
| Insulation thickness, μm per side | 11-13 | 17-18 | 10-12 | 18-21 | 16-20 |

What is claimed is:

1. A method of manufacturing a flat long-length second generation HTS wire comprising:
   (A) preparing an electrodeposition emulsion by mixing particles of P84 polyimide resin, a stabilizer chosen from the group comprising tertiary amines having a boiling point not exceeding 200° C., and an organic solvent chosen from the group consisting N-methylpyrrolidone and N,N-dimethylphormamide;
   stirring a mixture for a time necessary for a neutralization reaction between the polyimide and the stabilizer to occur to form an intermediate solution;
   forming the electrodeposition emulsion by adding a precipitating agent to the intermediate solution, the adding comprising first adding 50-60% of a total amount of the precipitating agent while stirring at a rate of 1000-3000 rpm, then adding the rest of the precipitating agent while stirring at a rate not exceeding 100 rpm;
   (B) electrodepositing the emulsion prepared at stage (A) onto an HTS wire in a deposition cathode cell by moving the HTS wire through the cell containing the emulsion and constantly stirring the emulsion by an inert gas flow while the HTS wire is in motion, wherein the cathode is at a negative potential and the HTS wire is at a positive potential, so that a voltage between the cathode and the HTS wire enables the deposition of polyimide particles onto the HTS wire; and
   (C) thermally treating the HTS wire surface by heating at a temperature not exceeding 200° C. to form an insulating film on the HTS wire.

2. The method of claim 1, wherein the stabilizer used at stage (A) is a tertiary amine selected from the group consisting of triethylamine, tripropylamine, triethanolamine, and tetramethyldiamine.

3. The method of claim 1, wherein the precipitating agent used at stage (A) is selected from from the group consisting of water, ethyl alcohol, isopropyl alcohol, and acetone.

4. The method of claim 1, wherein stirring mixture stirring at stage (A) to perform the neutralization reaction lasts for 12-60 hours.

5. The method of claim 1, wherein at stage (A) the precipitating agent is added to the intermediate solution at a rate of 50-500 mL/min.

6. The method of claim 1, wherein the wire is moved through the emulsion at stage (B) at a voltage of 10-50 V.

7. The method of claim 1, wherein the wire is moved through the emulsion at stage (B) at a speed of 10-30 m/hour.

8. The method of claim 1, wherein thermal treatment at stage (C) takes place in a through-type furnace with a temperature profile that gradually increases from 100° C. to the thermal treatment temperature.

9. The method of claim 1, wherein deposition at stage (B), and thermal treatment at stage (C) take place onto/with respect to the HTS wire having a copper and/or silver external coating.

\* \* \* \* \*